US010731536B1

(12) United States Patent
Chenoweth et al.

(10) Patent No.: US 10,731,536 B1
(45) Date of Patent: Aug. 4, 2020

(54) EXHAUST GAS AFTERTREATMENT SYSTEM

(71) Applicant: Caterpillar Inc., Deerfield, IL (US)

(72) Inventors: Kurtis Chenoweth, Ipava, IL (US); Jianping Pan, Dunlap, IL (US); Mohamed Daoud, Dunlap, IL (US); Y. T. Bui, Peoria, IL (US); Jason Hudgens, Washington, IL (US); Ian Aguirre, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/359,719

(22) Filed: Mar. 20, 2019

(51) Int. Cl.
*F01N 3/28* (2006.01)
*F01N 3/20* (2006.01)
*B01D 53/94* (2006.01)
*F01N 11/00* (2006.01)
*F01N 1/14* (2006.01)

(52) U.S. Cl.
CPC ....... *F01N 3/2892* (2013.01); *B01D 53/9431* (2013.01); *F01N 1/14* (2013.01); *F01N 3/2066* (2013.01); *F01N 11/002* (2013.01); *F01N 11/007* (2013.01); *F01N 2590/08* (2013.01); *F01N 2610/02* (2013.01); *F01N 2610/1453* (2013.01)

(58) Field of Classification Search
None
See application file for complete search history.

(56) References Cited

U.S. PATENT DOCUMENTS 9,011,782 B2    4/2015  Baig et al.
9,086,007 B2    7/2015  Baig et al.
9,616,383 B2    4/2017  Reichert et al.
9,803,529 B2   10/2017  Reichert et al.
9,925,502 B2    3/2018  De Rudder et al.
2011/0146236 A1 6/2011  Sun et al.
2011/0146253 A1* 6/2011  Isada .................... F01N 3/2073
                                                      60/302

(Continued)

FOREIGN PATENT DOCUMENTS

GB    2533331 A      12/2014
WO    2011110885 A1   9/2011

OTHER PUBLICATIONS

European Patent Office, International Search Report and the Written Opinion of the International Searching Authority, Application No. PCT/US2020/019190, dated Apr. 29, 2020.

*Primary Examiner* — Walter D. Griffin
*Assistant Examiner* — Jelitza M Perez
(74) *Attorney, Agent, or Firm* — Harrity & Harrity LLP

(57) ABSTRACT

An exhaust gas aftertreatment system is disclosed. The system may include an inlet to receive an exhaust gas produced by an engine and a first section to receive the exhaust gas from the inlet. The system may include a mixing tube to receive the exhaust gas from the first section and a reductant injector to inject a reductant into the mixing tube. The system may include a second section to receive the exhaust gas from the mixing tube and to facilitate mixing of the reductant and the exhaust gas after the exhaust gas exits the mixing tube and a diffuser to receive the exhaust gas from the second section. The system may include a plurality of catalysts to receive the exhaust gas from the diffuser and at least one outlet to receive the exhaust gas from the plurality of catalysts.

20 Claims, 5 Drawing Sheets

(56) References Cited

U.S. PATENT DOCUMENTS

| | | | |
|---|---|---|---|
| 2013/0164183 A1* | 6/2013 | Iijima | B01D 53/9431 422/170 |
| 2014/0260198 A1 | 9/2014 | Baig et al. | |
| 2015/0233276 A1 | 8/2015 | Cassity et al. | |
| 2015/0315948 A1 | 11/2015 | Weiss et al. | |
| 2016/0047285 A1 | 2/2016 | Alcini et al. | |
| 2017/0022869 A1* | 1/2017 | Ly | B01F 5/0268 |
| 2017/0152782 A1 | 6/2017 | Petry | |

* cited by examiner

EXHAUST GAS AFTERTREATMENT SYSTEM

TECHNICAL FIELD

The present disclosure relates generally to an aftertreatment system and, more particularly, to an exhaust gas aftertreatment system.

BACKGROUND

An aftertreatment system treats exhaust gas from an engine before the exhaust gas flows into the atmosphere. The aftertreatment system uses a reductant, such as ammonia, urea, and/or the like to convert nitrogen oxides (also referred to as $NO_x$) present in the exhaust gas into other molecules, such as nitrogen, water, carbon dioxide, and/or the like. The aftertreatment system may include a reductant injector that sprays the reductant into a mixing tube of the aftertreatment system as the exhaust gas flows through the mixing tube. This mixes the reductant into the exhaust gas while the exhaust gas flows through the mixing tube. A selective catalytic reduction (SCR) module, using one or more catalysts, converts the nitrogen oxides in the exhaust gas after the exhaust gas exits the mixing tube and flows into the SCR module.

In some cases, one or more factors may reduce the effectiveness of the aftertreatment system to treat the nitrogen oxides in exhaust gas. For example, a backpressure may be created by the exhaust gas flowing through the aftertreatment system, which may inhibit a flow of the exhaust gas to the catalysts in the SCR module. As another example, the reductant and exhaust gas may not be homogenously mixed before exiting the mixing tube, which decreases the capability of the SCR module to convert the nitrogen oxides in the exhaust gas.

One attempt to reduce backpressure in an aftertreatment assembly is disclosed in U.S. Patent Application Publication No. 2015/0315948 that published on Nov. 5, 2015 ("the '948 publication"). In particular, the '948 publication discloses a modular aftertreatment assembly that experiences a reduced amount of backpressures due to a split flow design that includes two banks of catalysts. In particular, the '948 publication discloses an aftertreatment assembly having a single central inlet end that receives and introduces exhaust gases into a mixing tube that includes slots at an outlet end. According to the '948 publication, the slots facilitate mixing of the exhaust gases and a reductant as the exhaust gases and reductant exit the mixing tube and allow the exhaust gases to exit the mixing tube without biasing a first and a second bank of catalysts. Per the '948 publication, the provision of two banks of catalysts leads to the doubling of catalyst faces, which in turn reduces the amount of back pressure experienced by the aftertreatment assembly.

The exhaust gas aftertreatment system of the present disclosure solves one or more problems faced by the aftertreatment assembly of the '948 publication and/or other problems in the art.

SUMMARY

According to some implementations, the present disclosure is related to an exhaust gas aftertreatment system. The exhaust gas aftertreatment system may include an inlet assembly and a selective catalytic reduction (SCR) assembly. The inlet assembly may include an inlet to receive an exhaust gas produced by an engine and a first section to connect with the inlet and to receive the exhaust gas from the inlet. The inlet assembly may include a mixing tube to connect with the first section and to receive the exhaust gas from the first section and a flow diverter to connect to the mixing tube and to affect a direction of flow of the exhaust gas as the exhaust gas enters the mixing tube. The inlet assembly may include a reductant injector to inject a reductant into the mixing tube to facilitate mixing of the reductant and the exhaust gas in the mixing tube; a mixer assembly to connect to the mixing tube to facilitate further mixing of the reductant and the exhaust gas in the mixing tube; and a second section to connect to the mixing tube, to receive the exhaust gas from the mixing tube, and to facilitate mixing of the reductant and the exhaust gas after the exhaust gas exits the mixing tube. The SCR assembly may connect to the second section, to receive the exhaust gas from the second section, and to output the exhaust gas.

According to some implementations, the present disclosure is related to an exhaust gas aftertreatment system. The exhaust gas aftertreatment system may include an inlet that uses a y-pipe configuration to receive an exhaust gas produced by an engine and a first section to receive the exhaust gas from the inlet. The exhaust gas aftertreatment system may include a mixing tube to receive the exhaust gas from the first section and a flow diverter to affect a direction of flow of the exhaust gas as the exhaust gas enters the mixing tube. The exhaust gas aftertreatment system may include a reductant injector to inject a reductant into the mixing tube to facilitate mixing of the reductant and the exhaust gas in the mixing tube and a mixer assembly to facilitate further mixing of the reductant and the exhaust gas in the mixing tube. The exhaust gas aftertreatment system may include a second section to receive the exhaust gas from the mixing tube and to facilitate mixing of the reductant and the exhaust gas after the exhaust gas exits the mixing tube and a diffuser to receive the exhaust gas from the second section. The exhaust gas aftertreatment system may include a bank of catalysts that includes a plurality of catalysts to receive the exhaust gas from the diffuser and at least one outlet to receive the exhaust gas from the bank of catalysts.

According to some implementations, the present disclosure is related to an inlet assembly. The inlet assembly may include an inlet to receive an exhaust gas produced by an engine and a first section to receive the exhaust gas from the inlet. The inlet assembly may include a mixing tube to receive the exhaust gas from the first section and a flow diverter to affect a direction of flow of the exhaust gas within the mixing tube. The inlet assembly may include a reductant injector to inject a reductant into the mixing tube and a mixer assembly to facilitate mixing of the reductant and the exhaust gas in the mixing tube. The inlet assembly may include a second section to receive the exhaust gas from the mixer assembly. The second section may include a plurality of walls configured to change a direction of flow of the exhaust gas in the second section to facilitate further mixing of the reductant and the exhaust gas. The second section may be configured to provide the exhaust gas to a selective catalytic reduction (SCR) assembly.

DETAILED DESCRIPTION

This disclosure relates to an exhaust gas aftertreatment system. The exhaust gas aftertreatment system has universal applicability to any machine that utilizes an engine system. The term "machine" may refer to any machine that performs an operation associated with an industry such as, for example, mining, construction, farming, transportation, or any other industry. As some examples, the machine may be a vehicle (e.g., a locomotive), a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment.

Figure 1:
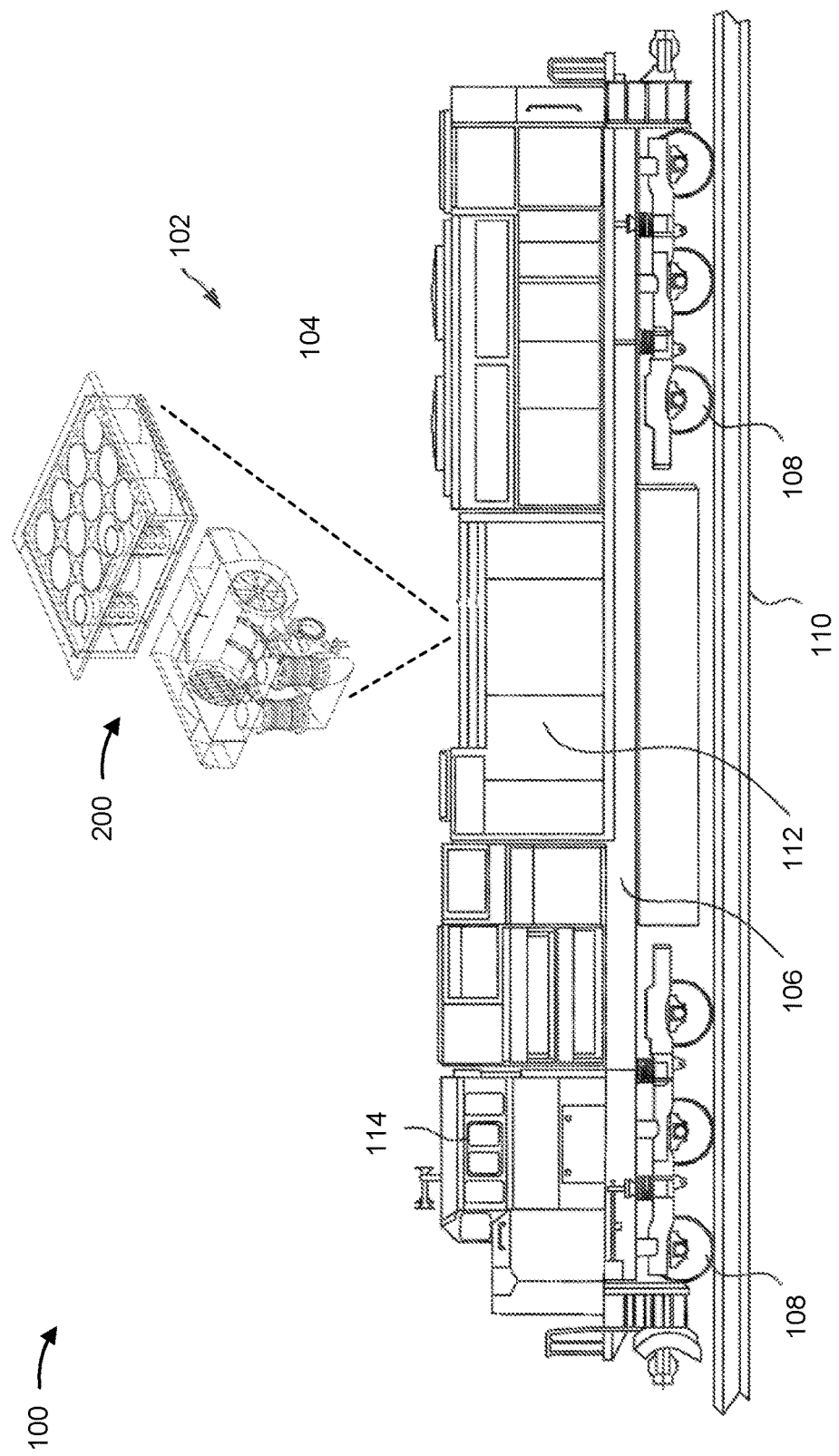
FIG. 1 is a diagram of an example machine that includes an exhaust gas aftertreatment system.

FIG. 1 is a diagram 100 of an example machine that includes an exhaust gas aftertreatment system described herein. Diagram 100 shows an example machine 102. The machine 102 will be described as a locomotive 104. However, the machine 102 may be any other machine described herein.

The locomotive 104 may include a frame 106. The frame 106 may support one or more components of the locomotive 104. The locomotive 104 may include a set of wheels 108 mounted to the frame 106. The wheels 108 may support and provide mobility to the locomotive 104 on a set of rails 110. The locomotive 104 may include an enclosure 112 mounted on the frame 106. The enclosure 112 may house one or more components (not shown) provided on the frame 106 of the locomotive 104.

The locomotive 104 may include an engine system (not shown) provided on the frame 106 and within the enclosure 112. The engine system may include an engine that is an internal combustion engine or a gas turbine engine. The engine may be powered by a fuel such as diesel, gasoline, natural gas, and/or the like, or a combination thereof. The engine may generate mechanical power for the locomotive 104. The engine may include an intake manifold that receives intake air through an air intake system of the engine. The engine may include an exhaust manifold that expels products of combustion, such as exhaust gas, from the engine.

The locomotive 104 may include an exhaust gas aftertreatment system 200 (described with respect to FIG. 2) provided on the frame 106 of the machine 102. The locomotive 104 may include an operator cabin 114 provided on the frame 106. The operator cabin 114 may house various controls of the locomotive 104 that may be configured to operate and/or control the locomotive 104.

As indicated above, FIG. 1 is provided as an example. Other examples may differ from what was described in connection with FIG. 1.

Figure 2:
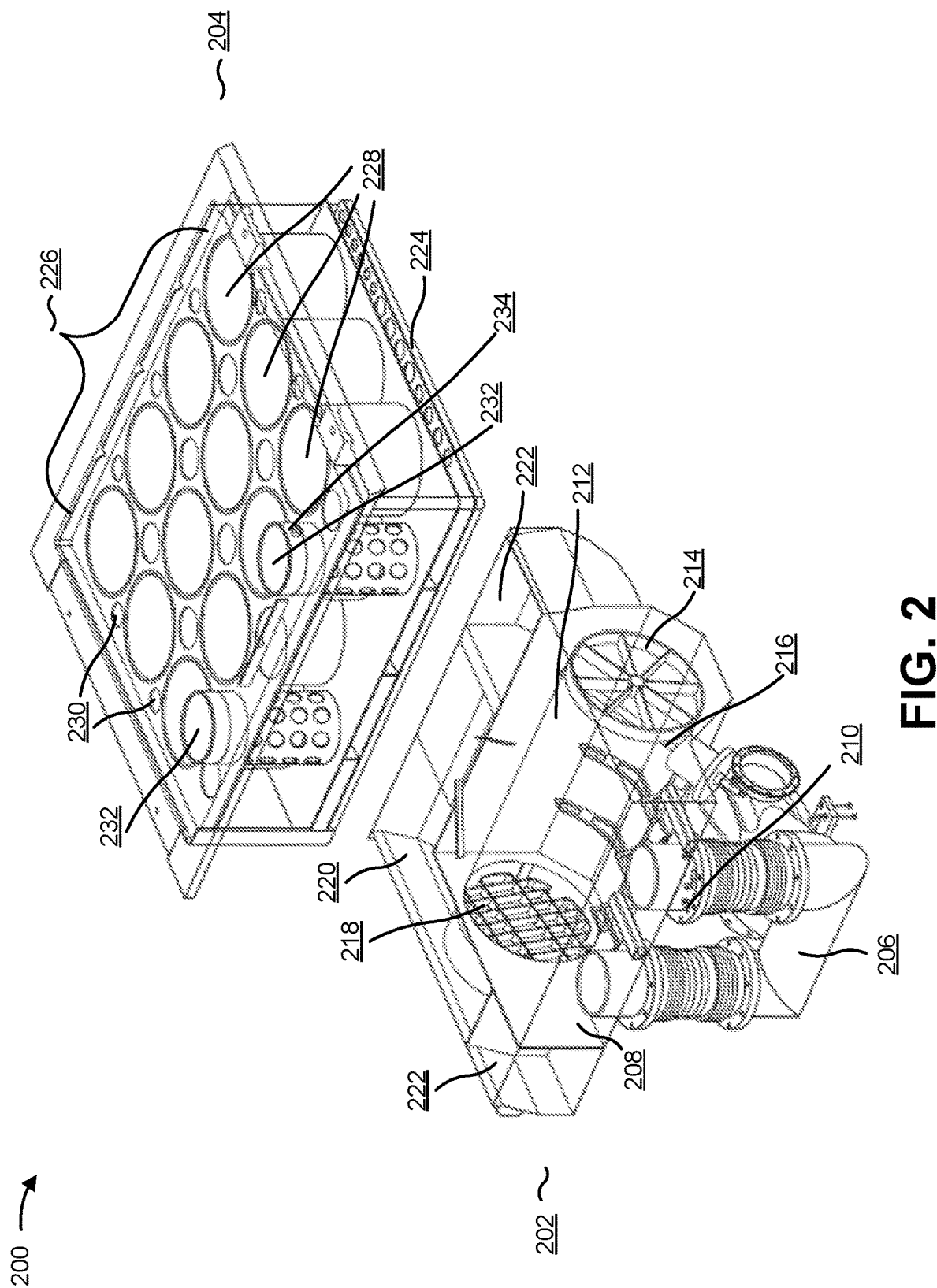
FIG. 2 is a diagram of an example exhaust gas aftertreatment system described herein.

FIG. 2 is a diagram of an example exhaust gas aftertreatment system 200 that includes an inlet assembly 202 and a selective catalytic reduction (SCR) assembly 204. Exhaust gas aftertreatment system 200 may be assembled such that inlet assembly 202 is coupled to SCR assembly 204 (e.g., using one or more fasteners, flanges, and/or the like) and SCR assembly 204 is disposed on inlet assembly 202. In some implementations, the exhaust gas aftertreatment system 200 is included in a package that has dimensions of approximately 1.332 meters by approximately 1.078 meters by approximately 1.510 meters. In such a package, inlet assembly 202 and SCR assembly 204 may have a combined volume of 200 liters to 400 liters, such as 270 liters. Additionally, or alternatively, SCR assembly 204 may have a volume range of approximately 133 liters to 400 liters.

The exhaust gas aftertreatment system 200 may treat the exhaust gas that exits the exhaust manifold of the engine. The exhaust gas aftertreatment system 200 may connect to the engine system via one or more conduits, hoses, and/or the like. For example, an inlet 206 of the inlet assembly 202 may connect to an exhaust conduit (not shown) of the engine. As shown in FIG. 2, inlet 206 may be a y-pipe (e.g., a pipe with a single inlet and two outlets) that allows the exhaust gas to flow into a first section 208 of the inlet assembly 202. The y-pipe configuration for inlet 206 may reduce backpressure on inlet 206 and/or first section 208 as the exhaust gas flows through inlet 206 into first section 208.

One or more inlet sensors 210 may be attached mounted on, integrated into, attached to, and/or affixed to inlet 206. For example, a respective inlet sensor 210 may be attached to each arm of y-pipe inlet 206. An inlet sensor 210 may detect an amount of nitrogen oxide (e.g., a concentration percentage of nitrogen oxide) in the exhaust gas, a temperature of the exhaust gas, a pressure associated with the exhaust gas (e.g., a pressure caused by the exhaust gas flowing through inlet 206, a backpressure caused by the exhaust gas flowing through inlet 206, and/or the like), and/or the like as the exhaust gas enters exhaust gas aftertreatment system 200. An inlet sensor 210 may send information relating to the amount of nitrogen oxide in the exhaust gas, the temperature of the exhaust gas, the pressure associated with the exhaust gas, and/or the like, associated with the exhaust gas as the exhaust gas enters exhaust gas aftertreatment system 200 to a controller (not shown) associated with the engine system to affect operation of the engine system (e.g. cause the engine system to operate in a manner that affects the amount of nitrogen oxide in the exhaust gas, the temperature of the exhaust gas, the pressure associated with the exhaust gas, and/or the like).

Inlet assembly 202 may include a mixing tube 212 within first section 208 (e.g., as shown in FIG. 2, suspended by one or more structural ribs in first section 208). Mixing tube 212 may have a cross section that is circular, oval, elliptical, oblong, and/or the like. After the exhaust gas enters first section 208, the exhaust gas may flow around an exterior surface of mixing tube 212 and enter an inlet end of mixing tube 212 via flow diverter 214. Flow diverter 214 may be mounted on, integrated into, attached to, and/or affixed to mixing tube 212 at the inlet end of mixing tube 212. Flow diverter 214 may affect a direction of flow of the exhaust gas as the exhaust gas enters mixing tube 212.

A reductant injector 216 may be mounted on, integrated into, attached to, and/or affixed to mixing tube 212 at the inlet end of mixing tube 212 (e.g., next to flow diverter 214). Reductant injector 216 may inject a liquid reductant, such as a diesel exhaust fluid (DEF), into mixing tube 212. The reductant may include urea, ammonia, and/or the like. Reductant injector 216 may be connected to a pump (not shown) that facilitates reductant injector 216 injecting the reductant into mixing tube 212 (e.g., the pump creates pressure to assist reductant injector 216 projecting an atomized mist of the reductant in mixing tube 212). As the exhaust gas and the reductant flow through the mixing tube to an outlet end of mixing tube 212, the exhaust gas and the reductant may mix together (e.g., ammonia particles of the reductant may mix with nitrogen oxide particles of the exhaust gas). A mixer assembly 218 may be mounted on, integrated into, attached to, and/or affixed to mixing tube 212 at the outlet end of mixing tube 212. Mixer assembly 218 may include one or more components that facilitate further mixing of the reductant and the exhaust gas. Mixer assembly 218 may include a flapper style mixer, a swirl plate mixer, and/or the like.

After flowing through the mixing tube 212, the exhaust gas may exit the outlet end of mixing tube 212 and flow into a second section 220. Second section 220 may include one or more walls for changing the direction of flow of the exhaust gas as the exhaust gas flows through second section 220, which facilitates greater mixing of the reductant and the exhaust gas before the exhaust gas flows into SCR assembly 204. For example, second section 220 may include one or more walls that cause the direction of flow of the exhaust gas to change a particular range of degrees, such as from 1 to 270 degrees, as the exhaust gas flows through second section 220.

As shown in FIG. 2, inlet assembly 202 may include one or more sound attenuation sections 222. The one or more sound attenuation sections 222 may be designed to attenuate a sound frequency range associated with operation of the engine. The one or more sound attenuation sections 222 may be designed to reduce a noise level associated with operation of the engine (e.g., reduce the noise level by a particular amount of decibels (dBA), such as 10 dBA to 30 dBA). The one or more sound attenuation sections 222 may be adjacent to first section 208 and/or second section 220.

SCR assembly 204 may include a diffuser 224. SCR assembly 204 may attach to the top of inlet assembly 202 via diffuser 224 (e.g., using one or more fasteners, flanges, and/or the like). Diffuser 224 may include one or more diffusion plates to distribute (e.g., evenly distribute) the exhaust gas across a face of diffuser 224 (e.g., an outlet face of diffuser 224) as the exhaust gas flows from second section 220 of inlet assembly 202 to diffuser 224 of SCR assembly 204. Diffuser 224 may include a plurality of holes via which the exhaust gas can traverse when flowing from inlet assembly 202 to SCR assembly 204. In some implementations, a first subset of the plurality of holes may have a different diameter from a second subset of the plurality of holes.

SCR assembly 204 may include a bank of catalysts 226 that includes one or more catalysts 228. The one or more catalysts 228 may have a cross section that is circular, oval, elliptical, oblong, and/or the like. As shown in FIG. 2, the bank of catalysts 226 includes twelve catalysts, but in practice, the bank of catalysts 226 may include any number of catalysts of any shape and/or size. In some implementations, the one or more catalysts 228 may have a height between 150 and 460 millimeters.

The bank of catalysts 226 may connect with second section 220 and diffuser 224 such that the exhaust gas flows from second section 220 to the bank of catalysts 226 via diffuser 224. For each catalyst 228, the exhaust gas may flow into catalyst 228 via an inlet end of catalyst 228. The bank of catalysts 226 may be arranged in SCR assembly 204 such that the respective inlet end of each catalyst 228 is parallel to and/or disposed on the face of diffuser 224. The one or more catalysts 228 may treat the exhaust gas (e.g., convert the nitrogen oxides in the exhaust gas into other molecules) as the exhaust gas flows through the one or more catalysts 228. The bank of catalysts 226 may include one or more perforations 230 (e.g., one or more spaces between the one or more catalysts 228), such that after the exhaust gas exits an outlet end of the one or more catalysts 228, the exhaust gas flows to one or more outlets 232 via the one or more perforations 230. The one or more perforations 230 may have a cross section that is circular, oval, elliptical, oblong, and/or the like.

SCR assembly 204 may include one or more outlets 232. The one or more outlets 232 may connect with the one or more catalysts 228 such that the exhaust gas flows from the one or more catalysts 228 to the one or more outlets 232 via the one or more perforations 230. Each outlet 232 may have a cross section that is circular, oval, elliptical, oblong, and/or the like and may include one or more holes to attenuate sound created by the exhaust gas flowing through outlet 232 and/or to reduce backpressure in SCR assembly 204. The one or more outlets 232 may be provided in an offset position from where the exhaust gas flows from second section 220 to diffuser 224 (e.g., an opposite side of diffuser 224 from where the exhaust gas flows from second section 220 to diffuser 224) to facilitate an equal distribution of flow of the exhaust gas to the one or more catalysts 228 via diffuser 224. The one or more outlets 232 may extend beyond an enclosure (not shown) of SCR assembly 204 to facilitate the exhaust gas flowing through and exiting the one or more outlets 232 into the atmosphere.

One or more outlet sensors 234 may respectively be mounted on, integrated into, attached to, and/or affixed to the one or more outlets 232. For example, a respective outlet sensor 234 may be attached to each outlet 232. An outlet sensor 234 may detect an amount of nitrogen oxide (e.g., a concentration percentage of nitrogen oxide) in the exhaust gas, a temperature of the exhaust gas, a pressure associated with the exhaust gas (e.g., a pressure caused by the exhaust gas flowing through outlet 232, a backpressure caused by the exhaust gas flowing through outlet 232, and/or the like), and/or the like as the exhaust gas exits exhaust gas aftertreatment system 200. An outlet sensor 234 may send information relating to the amount of nitrogen oxide in the exhaust gas, the temperature of the exhaust gas, the pressure associated with the exhaust gas, and/or the like as the exhaust gas exits exhaust gas aftertreatment system 200 to a controller (not shown) associated with the engine system to affect operation of the engine system (e.g., cause the engine system to operate in a manner that affects the amount of nitrogen oxide in the exhaust gas, the temperature of the exhaust gas, the pressure associated with the exhaust gas, and/or the like).

As indicated above, FIG. 2 is provided as an example. Other examples may differ from what was described in connection with FIG. 2.

Figure 3:
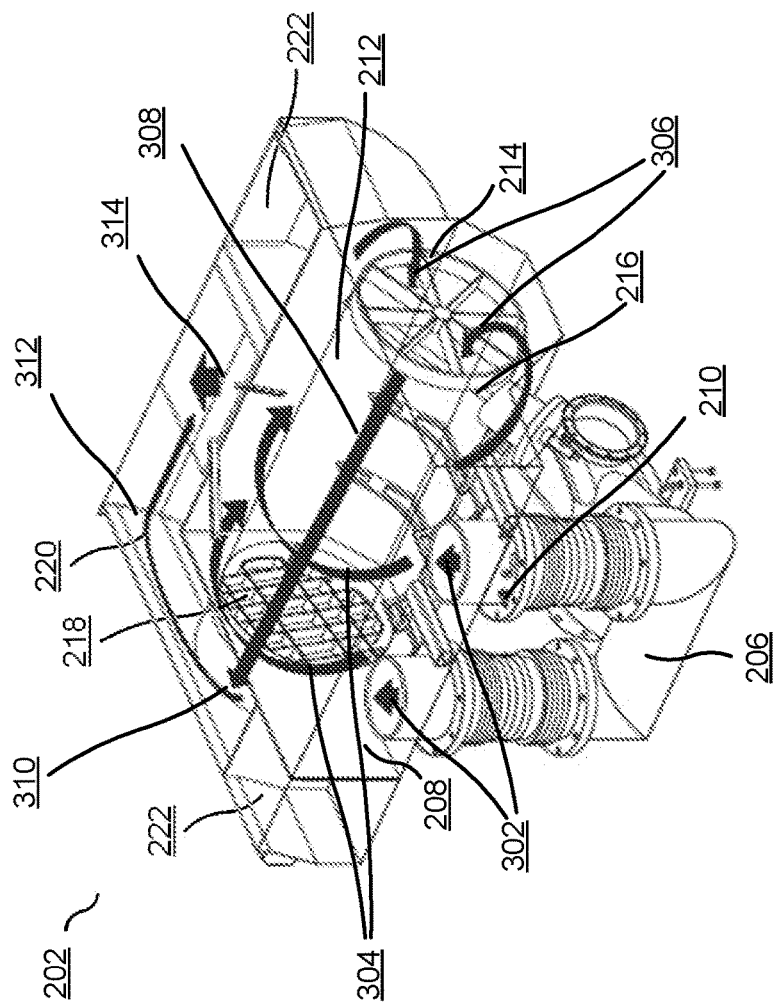
FIGS. 3-5 are diagrams illustrating an example flow of an exhaust gas through the example exhaust gas aftertreatment system of FIG. 2.
Figure 4:
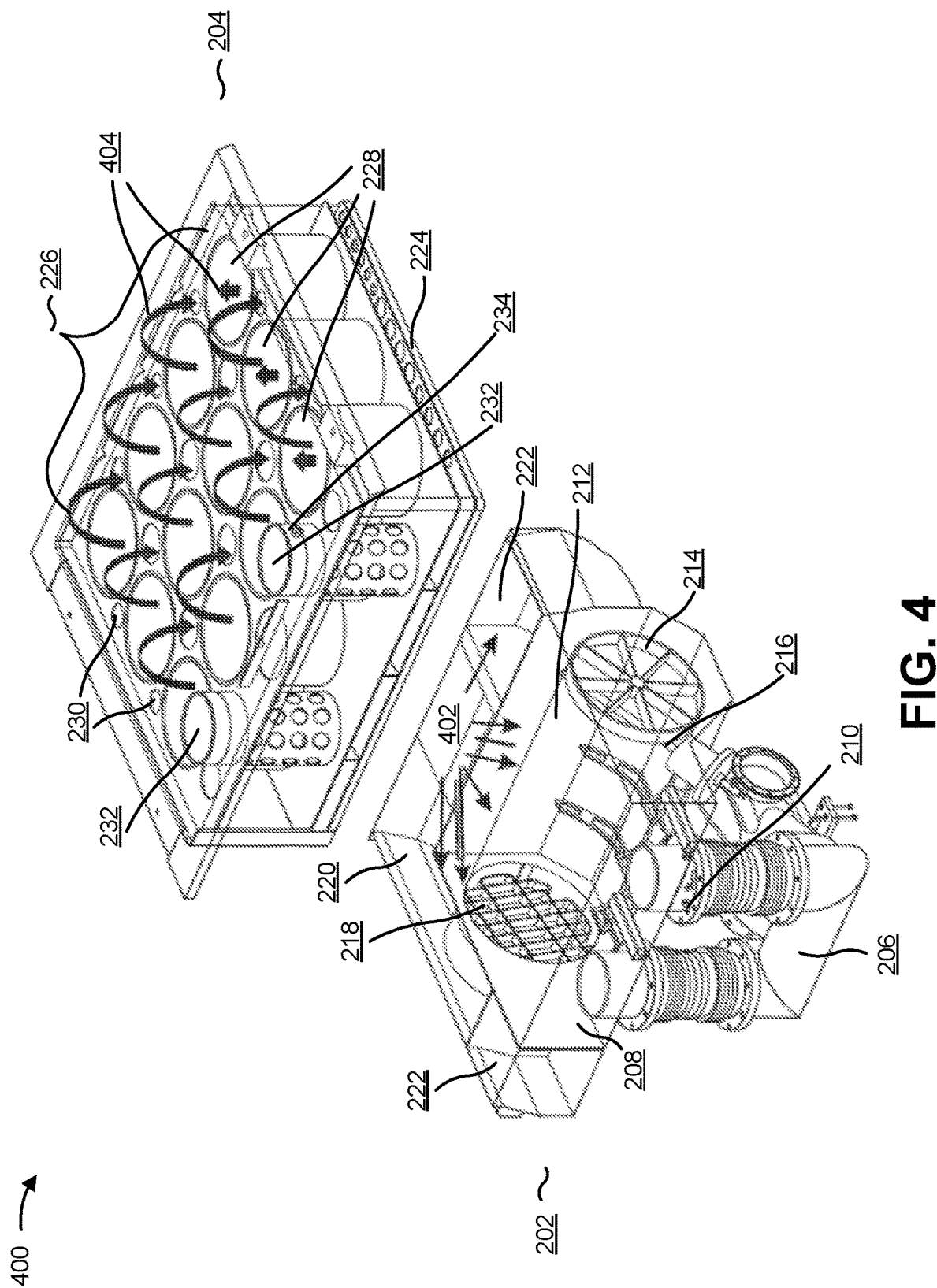
Figure 5:
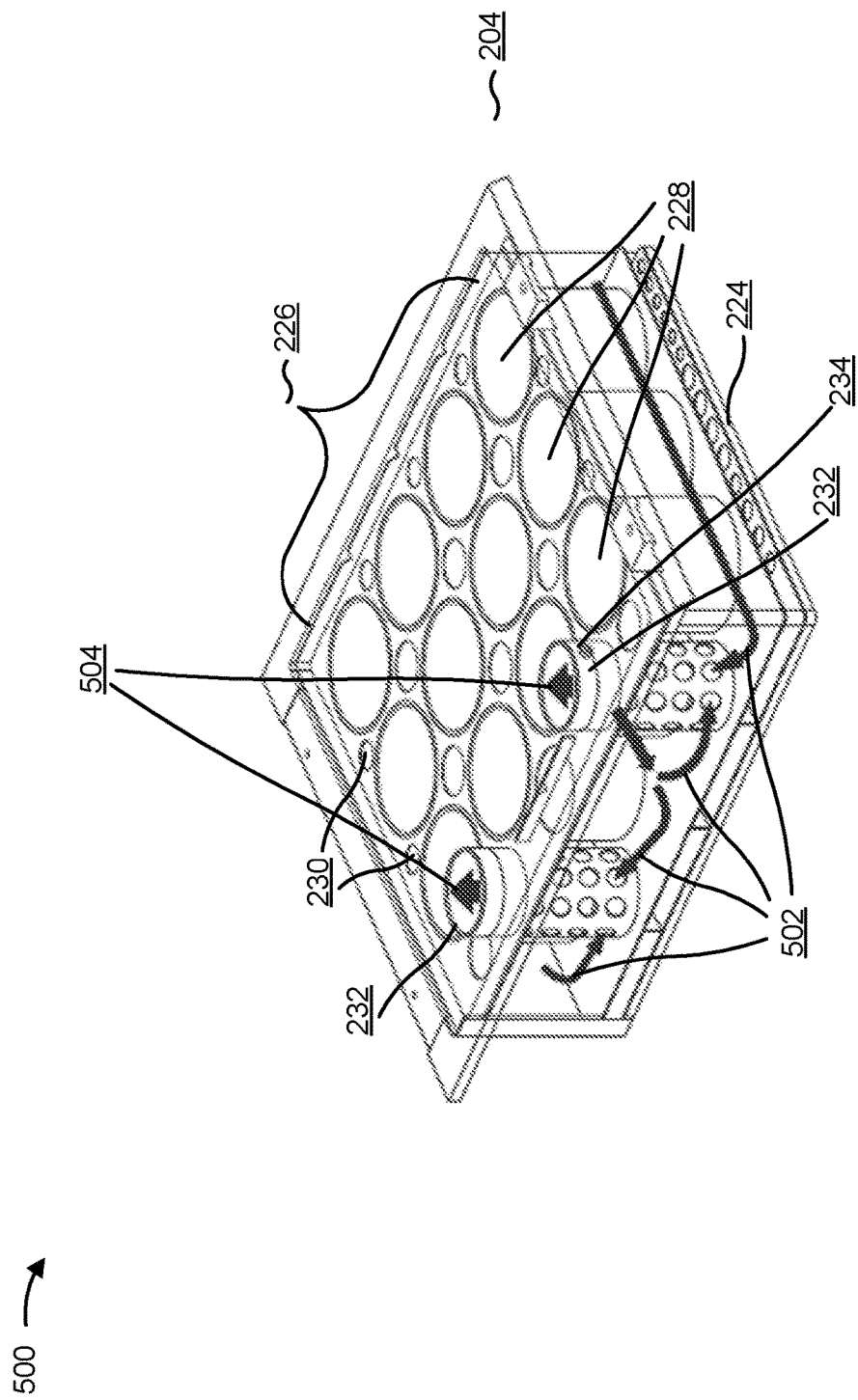

FIGS. 3-5 are diagrams illustrating an example flow of an exhaust gas through the example exhaust gas aftertreatment system of FIG. 2. A direction of flow of the exhaust through exhaust gas aftertreatment system 200 is indicated by a plurality of arrows.

As shown in FIG. 3 and example implementation 300, an exhaust gas from an engine system may flow into inlet 206 of inlet assembly 202. As shown by reference number 302, when inlet 206 conforms to a y-pipe configuration, the exhaust gas may flow through either arm of inlet 206 into first section 208. As the exhaust gas flows through inlet 206 and/or exits inlet 206, one or more inlet sensors 210 may detect an amount of nitrogen oxide in the exhaust gas, a temperature of the exhaust gas, a pressure associated with the exhaust gas, and/or the like.

As shown by reference number 304, the exhaust gas may enter first section 208 and flow around the exterior surface of mixing tube 212. This may insulate mixing tube 212 (e.g., as the exhaust gas flows around the mixing tube 212, heat from the exhaust gas may transfer to the mixing tube 212 and/or heat from the ambient air may be prevented from transferring to the mixing tube 212), which may prevent buildup of ammonia crystals within mixing tube 212 (e.g., by preventing cooler temperatures in mixing tube 212 that promote growth of ammonia crystals) as reductant is injected into mixing tube 212 by reductant injector 216. As shown by reference number 306, the exhaust gas may flow around the exterior surface of mixing tube 212 to the inlet end of mixing tube 212 to enter mixing tube 212. As shown by reference number 308, the exhaust gas may flow through flow diverter 214 as the exhaust gas enters mixing tube 212, which may cause the exhaust gas to flow straight (e.g., parallel to the length of mixing tube 212) into mixing tube 212. Additionally, or alternatively, flow diverter 214 may cause the exhaust gas to flow within a particular angle range (e.g., a particular angle range, such as 1 to 30 degrees, from parallel to the length of mixing tube 212) into mixing tube 212.

As the exhaust gas flows into mixing tube 212, reductant injector 216 may inject the reductant into mixing tube 212 to mix with the exhaust gas. The exhaust gas may flow through mixing tube 212 according to the trajectory that the exhaust gas entered mixing tube 212. For example, the exhaust gas may flow straight through mixing tube 212 (e.g., with minimal amounts of the exhaust gas encountering an interior surface of mixing tube 212) to the outlet of mixing tube 212. As another example, the exhaust gas may flow in a swirling motion through mixing tube 212 (e.g., where the exhaust gas flows along the inside surface of mixing tube 212 in a vortex-like motion). This in effect lengthens the distance that the exhaust gas flows through mixing tube 212, which facilitates greater mixing of the exhaust gas and the reductant as the exhaust gas flows through mixing tube 212.

As the exhaust gas flows to the outlet end of mixing tube 212, the exhaust gas may flow through mixer assembly 218. Mixer assembly 218 may break apart clumps of reductant that have not mixed with the exhaust gas, thus further facilitating greater mixing of the exhaust gas and the reductant as the exhaust gas flows out of mixing tube 212. The exhaust gas may exit mixing tube 212 via the outlet of mixing tube 212 and enter second section 220.

As shown by reference number 310, as the exhaust gas enters second section 220, the exhaust gas may encounter a first wall (e.g., a first wall normal to a direction of flow of the exhaust gas exiting mixing tube 212) of second section 220, which causes the direction of flow of the exhaust gas to change (e.g., causes the direction of flow of the exhaust gas to turn a particular angle, such as 90 degrees, from the direction of flow of the exhaust gas when the exhaust gas flows out of mixing tube 212). As shown by reference number 312, the exhaust gas may continue to flow in this direction until the exhaust gas encounters a second wall (e.g., a second wall normal to the direction of flow of the exhaust gas) of second section 220, which causes the direction of flow of the exhaust gas to change (e.g., causes the direction of flow of the exhaust gas to turn a particular angle, such as 90 degrees, to the prior direction of flow of the exhaust gas). As shown by reference number 314, the exhaust gas may continue to flow in this direction until the exhaust gas encounters a third wall (e.g., a third wall normal to the direction of flow of the exhaust gas) of second section 220, which causes the direction of flow of the exhaust gas to change (e.g., causes the direction of flow of the exhaust gas to turn a particular angle, such as 90 degrees, to the prior direction of flow of the exhaust gas) to allow the exhaust gas to flow to diffuser 224. In this way, second section 220 lengthens the distance the exhaust gas must flow through second section 220 before flowing to diffuser 224 (e.g., to make at least 270 degrees of turns), which facilitates greater mixing of the exhaust gas and the reductant as the exhaust gas flows through second section 220.

As shown in FIG. 4 and example implementation 400, the exhaust gas may flow from the inlet assembly 202 to the SCR assembly 204. For example, the exhaust gas may exit second section 220 and flow through diffuser 224 to the bank of catalysts 226. As shown by reference number 402, diffuser 224 may cause the exhaust gas to flow evenly across a face of diffuser 224 (e.g., an outlet face of diffuser 224) and/or a face of inlet assembly 202 so that equal (or near-equal) amounts of the exhaust gas flow into each catalyst 228 of the bank of catalysts 226. As the exhaust gas flows through the one or more catalysts 228, the one or more catalysts 228 may treat the exhaust gas (e.g. convert the nitrogen oxides in the exhaust gas into other molecules). As shown by reference number 404, as the exhaust gas exits the one or more catalysts 228, the exhaust gas may encounter the enclosure (not shown) of SCR assembly 204, which causes the direction of flow of the exhaust gas to change (e.g., causes the direction of flow of the exhaust gas to turn 180 degrees from the direction of flow of the exhaust gas as the exhaust gas flows out of the one or more catalysts 228). The exhaust gas may then flow to the one or more perforations 230.

As shown in FIG. 5 and example implementation 500, the exhaust gas may flow through the one or more perforations 230 and/or around the bank of catalysts 226 to the one or more outlets 232. As shown by reference number 502, the exhaust gas may enter the one or more outlets 232, via the one or more holes of outlets 232, and flow through the one or more outlets 232. The one or more outlet sensors 234 may detect an amount of nitrogen oxide in the exhaust gas, a temperature of the exhaust gas, a pressure associated with the exhaust gas, and/or the like as the exhaust gas flows through the one or more outlets 232 and/or exits one or more outlets. As shown by reference number 504, the exhaust gas may flow into the atmosphere after exiting the one or more outlets 232.

As indicated above, FIGS. 3-5 are provided as examples. Other examples may differ from what was described in connection with FIGS. 3-5.

INDUSTRIAL APPLICABILITY

The disclosed exhaust gas aftertreatment system 200 may be used with any engine system to treat nitrogen oxides in an exhaust gas produced by an engine of the engine system. Exhaust gas aftertreatment system 200 has a compact design (e.g., exhaust gas aftertreatment system 200 can be mounted and/or installed in a small space) and still provides a high catalyst volume compared to overall package volume of exhaust gas aftertreatment system 200. Notably, exhaust gas aftertreatment system 200 includes numerous design elements to reduce backpressure associated with the exhaust gas flowing through exhaust gas aftertreatment system 200, facilitate greater mixing of the exhaust gas with a reductant while the exhaust flows through exhaust gas aftertreatment system 200, attenuate noise associated with operation of the engine and/or associated with the exhaust gas flowing through exhaust gas aftertreatment system 200, and/or the like.

For example, exhaust gas aftertreatment system 200 includes two performance sections, an inlet assembly 202 and a selective catalytic reduction (SCR) assembly 204. Inlet assembly 202 includes an inlet 206 to receive exhaust gas and introduce the exhaust gas into a first section 208. Inlet 206 may use a y-pipe configuration to reduce backpressure on inlet 206. First section 208 allows the exhaust gas to flow around an exterior surface of a mixing tube 212 before the exhaust gas flows into an inlet end of mixing tube 212. The flow of the exhaust gas around the exterior surface of mixing tube 212 insulates mixing tube 212 and promotes greater mixing of the exhaust gas with a reductant while the exhaust gas flows in mixing tube 212 (e.g., by maintaining a high temperature within the mixing tube, which reduces a likelihood of the reductant cooling and depositing on an interior surface of the mixing tube before the reductant has a chance to mix with the exhaust gas). The exhaust gas may flow into the inlet of mixing tube 212 via a flow diverter 214, which causes the exhaust gas to flow through mixing tube 212 at an optimal trajectory to facilitate greater mixing of the exhaust gas and the reductant.

Moreover, inlet assembly 202 includes a reductant injector 216 that injects the reductant into mixing tube 212 as the exhaust gas flows through mixing tube 212. A mixer assembly 218 may be located at an outlet end of mixing tube 212 to aid break down of the reductant and facilitate greater mixing of the exhaust gas and the reductant. A second section 220 is connected to mixing tube 212 to allow the exhaust gas to flow from mixing tube 212 into second section 220. Second section 220 includes one or more walls that cause a direction of flow of the exhaust gas to change (e.g., 270 degrees of direction of flow changes) while the exhaust gas flows through second section 220, thus causing the exhaust to traverse a greater distance through second section 220 and thereby facilitating greater mixing of the exhaust gas and the reductant after the exhaust gas exits mixing tube 212.

Further, SCR assembly 204 is connected and/or disposed on inlet assembly 202. SCR assembly 204 includes a diffuser 224 that may include one or more diffusion plates to distribute the exhaust gas across a face of diffuser 224 as the exhaust gas flows from second section 220 of inlet assembly 202 to SCR assembly 204 via diffuser 224. Diffuser 224 can facilitate an even distribution of the exhaust gas to the one or more catalysts 228 of the bank of catalysts 226. This ensures that an optimal amount of nitrogen oxides in the exhaust gas may be treated by the one or more catalysts 228 as the exhaust gas flows through the one or more catalysts 228. The bank of catalysts 226 includes one or more perforations to facilitate, as the exhaust gas exits the one or more catalysts 228, flow of the exhaust gas to the one or more outlets 232. This also reduces backpressure created by the exhaust gas as the exhaust gas flows through SCR assembly 204. The one or more outlets 232 may include one or more holes to attenuate sound created by the exhaust gas entering and flowing through outlet 232 and/or to reduce backpressure in SCR assembly 204.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. An exhaust gas aftertreatment system, comprising:
   an inlet assembly that comprises:
      an inlet to receive an exhaust gas produced by an engine,
      a first section to connect with the inlet and to receive the exhaust gas from the inlet,
      a mixing tube to connect with the first section and to receive the exhaust gas from the first section,
      a flow diverter to connect to the mixing tube and to affect a direction of flow of the exhaust gas as the exhaust gas enters the mixing tube,
      a reductant injector to inject a reductant into the mixing tube to facilitate mixing of the reductant and the exhaust gas in the mixing tube,
      a mixer assembly to connect to the mixing tube to facilitate further mixing of the reductant and the exhaust gas in the mixing tube, and
      a second section to connect to the mixing tube, to receive the exhaust gas from the mixing tube, and to facilitate mixing of the reductant and the exhaust gas after the exhaust gas exits the mixing tube; and
   a selective catalytic reduction (SCR) assembly to connect to the second section, to receive the exhaust gas from the second section, and to output the exhaust gas,
      the SCR assembly including one or more outlets provided in an offset position from where the exhaust gas flows from the second section to a diffuser.

2. The exhaust gas aftertreatment system of claim 1, wherein the inlet is configured to reduce backpressure on the inlet.

3. The exhaust gas aftertreatment system of claim 1, wherein the flow diverter is configured to cause the exhaust gas to flow through the mixing tube in a swirling motion.

4. The exhaust gas aftertreatment system of claim 1, wherein the reductant injector is configured to project an atomized mist of the reductant in the mixing tube.

5. The exhaust gas aftertreatment system of claim 1, wherein the second section includes one or more walls,
   wherein a wall, of the one or more walls, is configured to turn a direction of flow of the exhaust gas in the second section.

6. The exhaust gas aftertreatment system of claim 1, wherein the second section includes one or more walls,
   wherein the one or more walls are configured to turn a direction of flow of the exhaust gas in a range from 1 to 270 degrees as the exhaust gas flows through the second section.

7. The exhaust gas aftertreatment system of claim 1, wherein the second section is configured to turn a direction of flow of the exhaust gas in the second section at least once.

8. An exhaust gas aftertreatment system, comprising:
   an inlet that uses a y-pipe configuration to receive an exhaust gas produced by an engine;
   a first section to receive the exhaust gas from the inlet;
   a mixing tube to receive the exhaust gas from the first section;
   a flow diverter to affect a direction of flow of the exhaust gas as the exhaust gas enters the mixing tube;

a reductant injector to inject a reductant into the mixing tube to facilitate mixing of the reductant and the exhaust gas in the mixing tube;

a mixer assembly to facilitate further mixing of the reductant and the exhaust gas in the mixing tube;

a second section to receive the exhaust gas from the mixing tube and to facilitate mixing of the reductant and the exhaust gas after the exhaust gas exits the mixing tube;

a diffuser to receive the exhaust gas from the second section;

a bank of catalysts that includes a plurality of catalysts to receive the exhaust gas from the diffuser; and at least one outlet to receive the exhaust gas from the bank of catalysts, the at least one outlet being provided in an offset position from where the exhaust gas flows from the second section to the diffuser.

9. The exhaust gas aftertreatment system of claim 8, further comprising:

an inlet sensor to obtain information relating to an amount of nitrogen oxide in the exhaust gas, a temperature of the exhaust gas, or a pressure associated with the exhaust gas.

10. The exhaust gas aftertreatment system of claim 8, further comprising:

an outlet sensor to:

obtain information relating to an amount of nitrogen oxide in the exhaust gas, a temperature of the exhaust gas, or a pressure associated with the exhaust gas; and send the information to an engine system associated with the engine to affect operation of the engine system.

11. The exhaust gas aftertreatment system of claim 8, further comprising:

at least one or more sound attenuation sections to attenuate a sound frequency range associated with operation of the engine.

12. The exhaust gas aftertreatment system of claim 8, wherein the diffuser includes at least one diffusion plate.

13. The exhaust gas aftertreatment system of claim 8, wherein the bank of catalysts includes a plurality of perforations configured to facilitate a flow of the exhaust gas from the plurality of catalysts to the at least one outlet and to reduce backpressure associated with the flow of the exhaust gas.

14. The exhaust gas aftertreatment system of claim 8, wherein an outlet, of the at least one outlet, includes one or more holes configured to facilitate receiving the exhaust gas from the bank of catalysts and to attenuate sound associated with the exhaust gas flowing into the outlet.

15. An inlet assembly, comprising:

an inlet to receive an exhaust gas produced by an engine;

a first section to receive the exhaust gas from the inlet;

a mixing tube to receive the exhaust gas from the first section;

a flow diverter to affect a direction of flow of the exhaust gas within the mixing tube;

a reductant injector to inject a reductant into the mixing tube;

a mixer assembly to facilitate mixing of the reductant and the exhaust gas in the mixing tube; and a second section to receive the exhaust gas from the mixer assembly, wherein the second section includes a plurality of walls configured to change a direction of flow of the exhaust gas in the second section to facilitate further mixing of the reductant and the exhaust gas, wherein the second section is to provide the exhaust gas to a selective catalytic reduction (SCR) assembly, and wherein the SCR assembly includes one or more outlets provided in an offset position from where the exhaust gas flows from the second section to a diffuser.

16. The inlet assembly of claim 15, wherein the inlet conforms to a y-pipe configuration.

17. The inlet assembly of claim 15, wherein the first section is to facilitate a flow of the exhaust gas around an exterior surface of the mixing tube, wherein the flow of the exhaust gas around the exterior surface of the mixing tube is to insulate the mixing tube.

18. The inlet assembly of claim 15, wherein the reductant is a diesel exhaust fluid (DEF), urea, or ammonia.

19. The inlet assembly of claim 15, wherein the plurality of walls of the second section are configured to turn a direction of flow of the exhaust gas in the second section at least 270 degrees.

20. The inlet assembly of claim 15, further comprising:

at least one or more sound attenuation sections to reduce a noise level associated with operation of the engine.

* * * * *